(12) United States Patent
Takács

(10) Patent No.: US 11,657,720 B2
(45) Date of Patent: May 23, 2023

(54) NETWORK COVERAGE AND POLICY INFORMATION GENERATION AND DISTRIBUTION FOR UNMANNED AERIAL VEHICLE FLIGHT PLANNING

(71) Applicant: Telefonaktiebolaget LM Ericsson (publ), Stockholm (SE)

(72) Inventor: Attila Takács, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 206 days.

(21) Appl. No.: 17/041,634

(22) PCT Filed: Mar. 30, 2018

(86) PCT No.: PCT/IB2018/052238
§ 371 (c)(1),
(2) Date: Sep. 25, 2020

(87) PCT Pub. No.: WO2019/186245
PCT Pub. Date: Oct. 3, 2019

(65) Prior Publication Data
US 2021/0118312 A1    Apr. 22, 2021

(51) Int. Cl.
G08G 5/00 (2006.01)
H04W 28/02 (2009.01)
H04W 48/08 (2009.01)

(52) U.S. Cl.
CPC ......... *G08G 5/0039* (2013.01); *G08G 5/0013* (2013.01); *H04W 28/021* (2013.01); *H04W 28/0205* (2013.01); *H04W 48/08* (2013.01)

(58) Field of Classification Search
CPC .............. G08G 5/0039; G08G 5/0013; H04W 28/0205; H04W 28/021; H04W 48/08; H04B 7/18506
See application file for complete search history.

(56) References Cited

U.S. PATENT DOCUMENTS

| | | |
|---|---|---|
| 7,813,326 B1 | 10/2010 | Kelm et al. |
| 9,363,690 B1 | 6/2016 | Singh et al. |
| 9,412,278 B1 | 8/2016 | Gong et al. |
| 9,467,922 B1 | 10/2016 | Buchmueller et al. |
| 9,537,561 B1 | 1/2017 | Kotecha et al. |

(Continued)

FOREIGN PATENT DOCUMENTS

| | | |
|---|---|---|
| CN | 101836478 A | 9/2010 |
| CN | 104053195 A | 9/2014 |

(Continued)

OTHER PUBLICATIONS

3GPP TS 23.203 V12.6.0, 3rd Generation Partnership Project, Technical Specification Group Services and System Aspects, Policy and charging control architecture, (Release 12), Sep. 2014, 220 pages.

(Continued)

*Primary Examiner* — Shon G Foley
(74) *Attorney, Agent, or Firm* — Nicholson De Vos Webster & Elliott LLP

(57) ABSTRACT

A method for managing an Unmanned Aerial Vehicle (UAV) is described. The method includes determining, by a Network Coverage and Policy Server (NCPS), an airspace; determining, by the NCPS, a granularity that indicates sizes for volume elements in a set of volume elements that logically divide the airspace; determining, by the NCPS, network policy information for volume elements in the set of volume elements to produce one or more maps; and transferring, by the NCPS, the one or more maps to a UAV Traffic Management (UTM) system.

19 Claims, 10 Drawing Sheets

(56) References Cited

U.S. PATENT DOCUMENTS

| | | | |
|---|---|---|---|
| 9,588,516 B1 | 3/2017 | Gurel et al. | |
| 9,609,288 B1 | 3/2017 | Richman et al. | |
| 9,709,409 B2 | 7/2017 | Dave et al. | |
| 9,818,303 B2* | 11/2017 | Kotecha | G08G 5/0026 |
| 2004/0156399 A1 | 8/2004 | Eran | |
| 2007/0284474 A1 | 12/2007 | Olson et al. | |
| 2009/0248224 A1* | 10/2009 | Tschannen | G01C 23/00 701/3 |
| 2010/0062774 A1 | 3/2010 | Motegi et al. | |
| 2010/0085236 A1 | 4/2010 | Franceschini et al. | |
| 2010/0153001 A1 | 6/2010 | Bauchot et al. | |
| 2010/0254346 A1 | 10/2010 | Jain et al. | |
| 2012/0225675 A1 | 9/2012 | Nishida et al. | |
| 2013/0124089 A1* | 5/2013 | Herman | G01C 21/20 701/528 |
| 2014/0293955 A1* | 10/2014 | Keerthi | H04L 5/0007 370/330 |
| 2015/0038140 A1 | 2/2015 | Kilpatrick et al. | |
| 2015/0119043 A1 | 4/2015 | Gopal et al. | |
| 2015/0208300 A1 | 7/2015 | McLaughlin et al. | |
| 2015/0312813 A1 | 10/2015 | Xu et al. | |
| 2016/0065345 A1 | 3/2016 | Kim et al. | |
| 2016/0070265 A1 | 3/2016 | Liu et al. | |
| 2016/0125740 A1 | 5/2016 | Pasko et al. | |
| 2016/0140851 A1 | 5/2016 | Levy et al. | |
| 2016/0142944 A1 | 5/2016 | Cao | |
| 2016/0142994 A1 | 5/2016 | Luo et al. | |
| 2016/0161258 A1 | 6/2016 | Magson et al. | |
| 2016/0266579 A1 | 9/2016 | Chen et al. | |
| 2016/0284221 A1 | 9/2016 | Hinkle et al. | |
| 2016/0292403 A1 | 10/2016 | Gong et al. | |
| 2016/0300493 A1 | 10/2016 | Ubhi et al. | |
| 2016/0300495 A1 | 10/2016 | Kantor et al. | |
| 2016/0358187 A1 | 12/2016 | Radocchia et al. | |
| 2016/0363929 A1 | 12/2016 | Clark et al. | |
| 2016/0371985 A1 | 12/2016 | Kotecha | |
| 2016/0371987 A1 | 12/2016 | Kotecha | |
| 2016/0380692 A1 | 12/2016 | Jalali et al. | |
| 2017/0023939 A1 | 1/2017 | Leonard et al. | |
| 2017/0045884 A1 | 2/2017 | Kablaoui | |
| 2017/0092137 A1 | 3/2017 | Hiebl | |
| 2017/0124884 A1 | 5/2017 | Shaw et al. | |
| 2017/0142766 A1 | 5/2017 | Kim | |
| 2017/0150373 A1 | 5/2017 | Brennan et al. | |
| 2017/0168480 A1 | 6/2017 | Wanstedt et al. | |
| 2018/0086483 A1 | 3/2018 | Priest et al. | |
| 2018/0152510 A1 | 5/2018 | Newton et al. | |
| 2018/0247544 A1 | 8/2018 | Mustafic et al. | |
| 2018/0279348 A1 | 9/2018 | Huang et al. | |
| 2019/0012923 A1 | 1/2019 | Weisbrod et al. | |
| 2019/0087576 A1 | 3/2019 | Olson | |
| 2019/0191334 A1* | 6/2019 | Montsma | H04B 7/18508 |
| 2019/0289505 A1 | 9/2019 | Thomas et al. | |
| 2019/0364492 A1 | 11/2019 | Azizi et al. | |
| 2020/0005651 A1 | 1/2020 | Priest | |
| 2020/0105149 A1 | 4/2020 | Mahkonen et al. | |
| 2020/0193844 A1 | 6/2020 | Mahkonen et al. | |

FOREIGN PATENT DOCUMENTS

| | | |
|---|---|---|
| CN | 105828345 A | 8/2016 |
| EP | 2175290 A1 | 4/2010 |
| EP | 3029996 A1 | 6/2016 |
| EP | 3139516 A1 | 3/2017 |
| EP | 3349085 A1 | 7/2018 |
| JP | 2003-092545 A | 3/2003 |
| RU | 2595642 C1 | 8/2016 |
| RU | 2637838 C2 | 12/2017 |
| WO | 2011/100535 A1 | 8/2011 |
| WO | 2012/112097 A1 | 8/2012 |
| WO | 2015/114572 A1 | 8/2015 |
| WO | 2015/179439 A1 | 11/2015 |
| WO | 2016/154949 A1 | 10/2016 |
| WO | 2016/161637 A1 | 10/2016 |
| WO | 2016/164892 A1 | 10/2016 |
| WO | 2016/190793 A1 | 12/2016 |
| WO | 2017/042403 A1 | 3/2017 |
| WO | 2017/048363 A1 | 3/2017 |
| WO | 2017/149160 A1 | 9/2017 |

OTHER PUBLICATIONS

3GPP TS 23.203 V14.2.0, 3rd Generation Partnership Project, Technical Specification Group Services and System Aspects, Policy and charging control architecture, (Release 14), Dec. 2016, 256 pages.

3GPP TS 23.271 V14.0.0, "3rd Generation Partnership Project, Technical Specification Group Services and System Aspects, Functional stage 2 description of Location Services (LCS)", (Release 14), Dec. 2016, 180 pages.

3GPP TS 23.401 V14.2.0, 3rd Generation Partnership Project, Technical Specification Group Services and System Aspects, General Packet Radio Service (GPRS) enhancements for Evolved Universal Terrestrial Radio Access Network (E-UTRAN) access, (Release 14), Dec. 2016, 385 pages.

3GPP TS 36.201 V14.0.0, "3rd Generation Partnership Project, Technical Specification Group Radio Access Network, Evolved Universal Terrestrial Radio Access (E-UTRA) LTE physical layer; General description", (Release 14), Sep. 2016, 15 pages.

3GPP TS 36.300 V14.1.0, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 14), Dec. 2016, 317 pages.

3GPP TS 45.002 V14.0.0, "3rd Generation Partnership Project, Technical Specification Group Radio Access Network, GSM/EDGE Multiplexing and multiple access on the radio path", (Release 14), Dec. 2016, 142 pages.

3UR.ET 1 .ST05.2000-STD-12-01, Eurocontrol Standard Document for Surveillance Data Exchange, Part 12: Category 021, ADS-B Reports, Dec. 2010, 72 pages.

Aerodynamics, Beginners' Guide: Radio Control, available online at <https://rcplanes.online/guide1.htm>, May 8, 2019, 9 pages.

Curran et al., "Location Based Predictive Handoff Algorithm for Mobile Networks," Advances in Intelligent IT: Active Media Technology, May 2006, pp. 86-91.

Federal Aviation Administration, "Automatic Dependent Surveillance-Broadcast (ADS-B)", Mar. 12, 2019, 2 pages.

Forsberg, Fredrik, "Providing Air Traffic Control Services for Small Unmanned Aircraft Through LTE", Oct. 28, 2016, 90 pages.

GPS World, "uAvionix demonstrates dime-sized ADS-B for high-traffic drone operations", available online at <http://gpsworld.com/uavionix-demonstrates-dime-sized-ads-b-for-high-traffic-drone-operations>, retrieved on Apr. 4, 2017, 6 pages.

Guterres et al., "ADS-B Surveillance System Performance with Small UAS at Low Altitudes", American Institute of Aeronautics and Astronautics, 2017, pp. 1-15.

Huawei et al., "Mobility enhancement for Drones", 3GPP, Meeting #98, R2-1704997,May 15-19, 2017, 6 pages.

Huawei et al., "Potential enhancements for drones", 3GPP, Meeting #89, R1-1707016,May 15-19, 2017, 4 pages.

IEEE Standard for Information technology, "Part 11: Wireless LAN Medium Access Control (MAC) and Physical Layer (PHY) Specifications", IEEE Computer Society, Mar. 2012, 2793 pages.

Kapellaki et al., "The "Le" interface: performance evaluation of 2-tier and 3-tier 3GPP compliant realizations," IEEE International Conference on Communications, ICC 2005, vol. 3, No. 16, 2005, pp. 1423-1427.

KDDI Corporation, "Field measurement results for drone LTE enhancement", Meeting 88bis, R1-1705823, Apr. 3-7, 2017, 6 pages.

Latas, "The Drone Safety Platform", available online at <http://www.flylatas.com/>, retrieved on Mar. 31, 2017, 7 pages.

LG Electronics Inc., "Aerial Traffic Handling using Positioning Identification", 3GPP, Meeting #98, R2-1705660, May 15-19, 2017, 2 pages.

(56) References Cited

OTHER PUBLICATIONS

Mavlink, "Mavlink Common Message set specifications", available online at <http://mavlink.org/messages/common>, retrieved on Jan. 31, 2017, 98 pages.
Opensignal, "Opensignal combines real-world measurements with scientific analysis to provide independent insights on mobile connectivity globally", available online at <https://www.opensignal.com/>, 2020, 4 pages.
Orefice, "ADS-B Based Sense and Avoid Applications for General Aviation/Unmanned Aircraft", 2015,114 pages.
Qualcomm, LTE Unmanned Aircraft Systems, Qualcomm Technologies, Inc., Trial Report, v1.0.1. May 12, 2017, 65 pages.
Ruano et al., "Augmented Reality Tool for the Situational Awareness Improvement of UAV Operators", Sensors, vol. 17, 2017, 16 pages.
UAS Identification and Tracking (UAS ID) Aviation Rulemaking Committee (ARC), ARC Recommendations Final Report, Sep. 30, 2017, 213 pages.
UAvionix, "ADS-B Transceivers, Receivers and Navigation Systems for Drones", available online at <http://www.unmannedsystemstechnology.com/company/uavionix-corporation>, retrieved on Apr. 4, 2017,10 pages.
Unmanned Aircraft System (UAS) Traffic Management (UTM), available online at <https://utm.arc.nasa.gov/index.shtml>, retrieved on Apr. 4, 2017,2 pages.
Wikipedia, "Blockchain", available online at <https://en.wikipedia.org/w/index.php?title=Blockchain&oldid=901056350>, retrieved on Jun. 9, 2019, 20 pages.
Wikipedia, "Global Positioning System", available online at <https://en.wikipedia.org/w/index.php?title=Global_Positioning_System&oldid=917890871>, Sep. 26, 2019, 21 pages.

\* cited by examiner

NETWORK COVERAGE AND POLICY INFORMATION GENERATION AND DISTRIBUTION FOR UNMANNED AERIAL VEHICLE FLIGHT PLANNING

CROSS-REFERENCE TO RELATED APPLICATIONS

This application is a national stage of International Application No. PCT/IB2018/052238, filed Mar. 30, 2018, which is hereby incorporated by reference.

FIELD

Embodiments of the invention relate to the field of managing Unmanned Aerial Vehicles (UAVs); and more specifically, to generating and distributing network coverage and policy information for use in planning UAV flights.

BACKGROUND

There is increasing interest in using Unmanned Aerial Vehicle's (UAVs) for a wide variety of applications throughout society and, in particular, small UAVs (sUAVs). Examples include delivery services, aerial photography and film making, remote sensing tasks for agriculture, city planning, civil engineering, and support for public safety and rescue services. These applications all involve the use of UAVs operating at low altitudes and often above urban areas. In some situations, the UAVs are manually flown by their operator while in other situations the UAVs may be flown using some level of autonomy where a human UAV operator monitors multiple aircraft and intervenes only when trouble arises.

The Federal Aviation Administration (FAA) and National Aeronautics and Space Administration (NASA) are defining an Unmanned Aerial Vehicle (UAV) Traffic Management (UTM) system. The UTM is composed of several components, including a UAV Service Supplier (USS), which is an entity that manages, approves, and de-conflicts UAV flights in an airspace. The USS is used by UAV operators who are the actual users of UAVs. The USS can access various data sources to make safe and efficient use of the airspace.

One important element in managing UAVs is ensuring that UAVs have adequate and reliable network connectivity throughout a flight/mission. Terrestrial mobile networks can be used to provide network connectivity for UAVs during flight; however, one difficulty with using current mobile networks is that these networks have been designed for ground-based user equipment. Since current mobile networks are intended for ground-based user equipment, network connectivity characteristics at various altitudes is unknown. Without knowledge of network connectivity at various locations in an airspace, planning and adjusting UAV flights is difficult, particularly for UAV flights that are heavily dependent on network resources (e.g., UAV flights that provide video streaming and/or that require mission critical input from a UAV operator).

SUMMARY

A method for managing an Unmanned Aerial Vehicle (UAV) is described. The method includes determining, by a Network Coverage and Policy Server (NCPS), an airspace; determining, by the NCPS, a granularity that indicates sizes for volume elements in a set of volume elements that logically divide the airspace; determining, by the NCPS, network policy information for volume elements in the set of volume elements to produce one or more maps; and transferring, by the NCPS, the one or more maps to a UAV Traffic Management (UTM) system.

As described above, the network connectivity and/or policy information provided within a map represents network access in the airspace. By using this information to plan or adjust flights for the UAV, the UTM system may ensure that network requirements are satisfied throughout a flight mission, including deviations to an original flight plan. In particular, the maps generated by the NCPS and utilized by the UTM system provide a standardized representation of network access in the three-dimensional airspace that may be configured by a network system and easily distributed to and utilized by various UTM systems for managing flights of UAVs.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
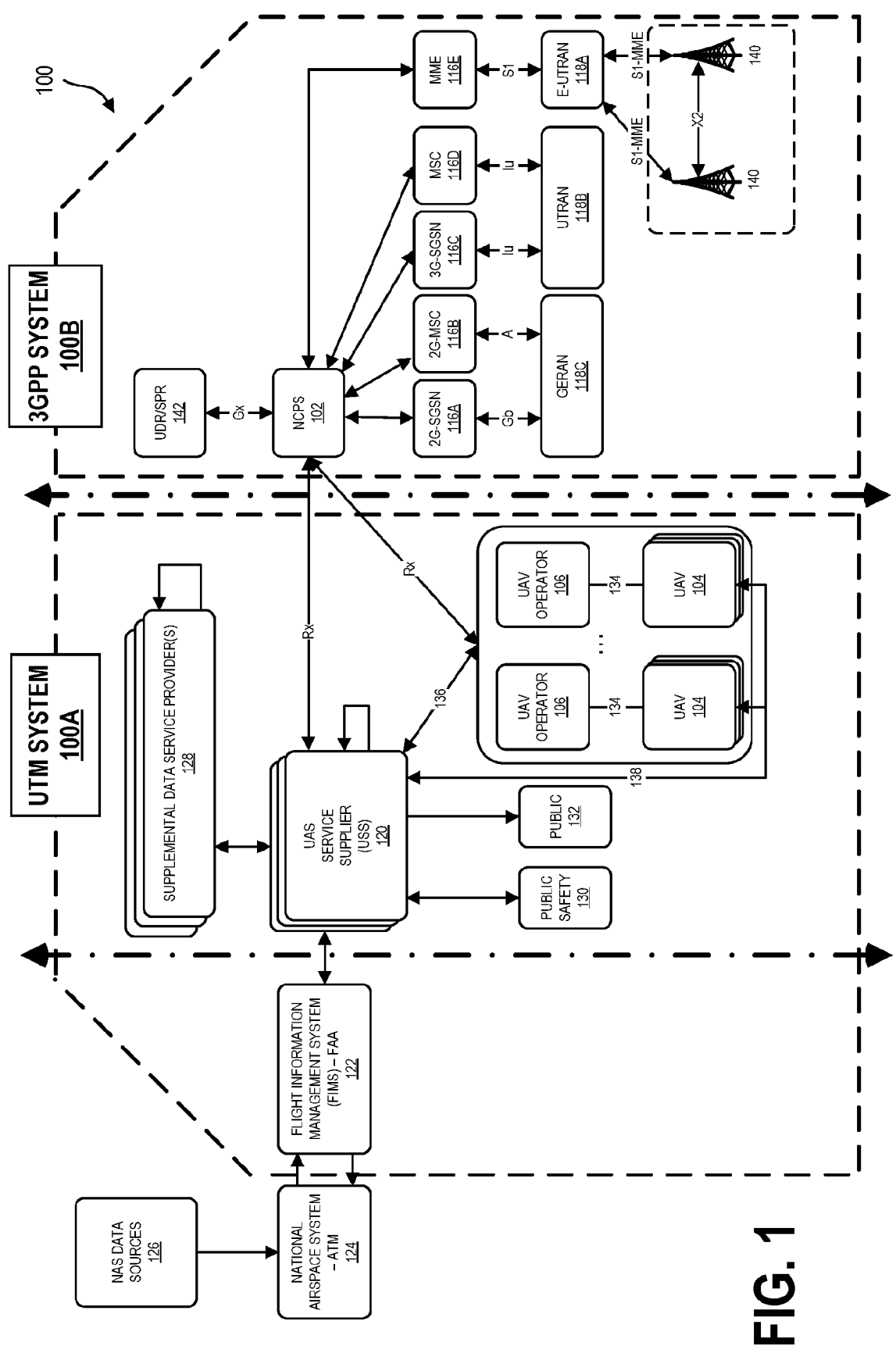
FIG. 1 illustrates an Unmanned Aerial Vehicle (UAV) Traffic Management (UTM) system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A system, according to one embodiment, is presented herein for efficiently generating, representing, and conveying network connectivity and/or policy information for one or more network systems for use in planning and/or adjusting a flight plan for an Unmanned Aerial Vehicle (UAV). In particular, a UAV operator may be planning a UAV flight in a designated three-dimensional geospatial airspace (e.g., above a park or city center). One or more network systems (e.g., one or more 3rd Generation Partnership Project (3GPP) networks or another non-cellular system) may provide network access to user equipment, including the UAV, in the airspace. However, network connectivity and/or network policies may be non-uniform in the airspace. For example, available bandwidth in a first portion of the airspace may be less than available bandwidth in a second portion of the airspace. This non-uniform network connectivity may be the result of numerous factors, including distance from network cells, obstructions, and density of user equipment. Similarly, a network operator may implement dissimilar network policies in the first portion of the network system and the second portion of the network system (e.g., dissimilar permitted network traffic policies). For example, although network connectivity in the first portion of the airspace may be strong, the network operator may prefer that UAVs not utilize particular bands in this portion of the airspace (e.g., the first portion may be adjacent a medical facility and these restricted bands are prioritized for emergency services). However, this network usage policy may not be present in the second portion of the airspace (i.e., the bands restricted in the first portion of the airspace are not restricted in the second portion of the airspace).

To address the inconsistent nature of network connectivity and/or policies in the airspace, a network connectivity and policy information (NCPI) map may be generated and distributed to one or more components of a UAV Traffic Management (UTM) system (e.g., a UAV, a UAV operator, and/or a UAV Service Supplier (USS) that manages UAV flights in the airspace). To generate the NCPI map, the airspace may be logically divided into a set of volume elements that represent three-dimensional portions of the airspace. For volume elements, the NCPI map includes network connectivity and/or policy information descriptive of the corresponding three-dimensional area within the airspace. As will be described in detail below, the network connectivity and policy information may include various pieces of data and may describe one or more network systems and/or network technologies. Following generation and distribution to various components of one or more UTM systems, the NCPI map may be used to more fully understand the capabilities and constraints of the airspace such that an efficient and effective UAV flight plan may be generated and/or an appropriate deviation to a flight plan may be undertaken by the UAV upon the occurrence of an unanticipated event. In this fashion, flights of UAVs may be intelligently planned/undertaken to ensure desired or necessary network resources are available throughout the flight.

FIG. 1 shows an air traffic system 100 for managing a flight of a UAV 104, according to one embodiment. The air traffic system 100 may be used for managing the flights of one or more UAVs 104 that are controlled/operated/piloted by corresponding UAV operators 106. The UAVs 104 may be interchangeably referred to as Unmanned Aircraft Systems (UASs) or drones throughout this description. The air traffic system 100 may be divided into two logical portions: a UAV Traffic Management (UTM) system 100A and a 3rd Generation Partnership Project (3GPP) system/architecture 100B. In this configuration, the 3GPP system 100B provides network connectivity and/or policy information to the UTM system 100A such that the UTM system 100A may plan and/or adjust a flight for one or more UAVs 104. By providing network connectivity and/or policy information to the UTM system 100A, flights of UAVs 104 may be planned and/or adjusted to ensure adequate network access to UAVs 104 is maintained throughout flights.

Although described in relation to a 3GPP network system, the systems and method described herein may be used in conjunction with any type of network system or any set of network systems. In some embodiments, the systems and methods described herein are utilized for multiple network systems providing network access to a single airspace. Thus, the use of the single 3GPP system 100B is illustrative rather than limiting.

In some embodiments, the UAVs 104 may be small or miniature UAVs, which are unmanned aircraft that are small enough to be considered portable by an average man and typically operate/cruise at altitudes lower than larger aircraft. For example, a small UAV may be any unmanned aircraft that is fifty-five pounds or lighter and/or is designed to operate below 400 feet. Although the embodiments described herein may be applied to small UAVs, the systems and methods are not restricted to aircraft of these sizes or that are designed to operate at particular altitudes. Instead, the methods and systems described herein may be similarly applied to aircraft of any size or design and with or without an onboard pilot/operator. For example, in some embodiments, the methods and systems described herein may be used for UAVs 104 larger than fifty-five pounds and/or UAVs 104 that are designed to fly above 400 feet.

The UAVs 104 are aircrafts without an onboard human controller. Instead, the UAVs 104 may be operated/piloted using various degrees of autonomy. For example, a UAV 104 may be operated by a human (e.g., the UAV operator 106) located on the ground or otherwise removed and independent of the location of the UAV 104. For example, a UAV operator 106 may be located on the ground and acts to directly control each movement of a UAV 104 or a group of UAVs 104 through a radio control interface (e.g., a command and control (C2) interface). In this embodiment, the UAV operator 106 may transmit commands via a radio interface to cause the UAV 104 to adjust/move particular flight instruments (e.g., flaps, blades, motors, etc.) for the purpose of following a flight plan or another set of objectives. In other scenarios, the UAV operator 106 may provide a flight plan to the UAV 104. In response to the flight plan, the UAV 104 may adjust/move particular flight instruments to fulfill objectives of the flight plan. In these embodiments, a human operator may monitor the progress of the flight plan and intervene as needed or as directed. In some embodiments, the UAV operator 106 may be viewed as a remote human controller, a remote digital controller, an onboard digital controller, or a combination of the preceding.

Figure 2:
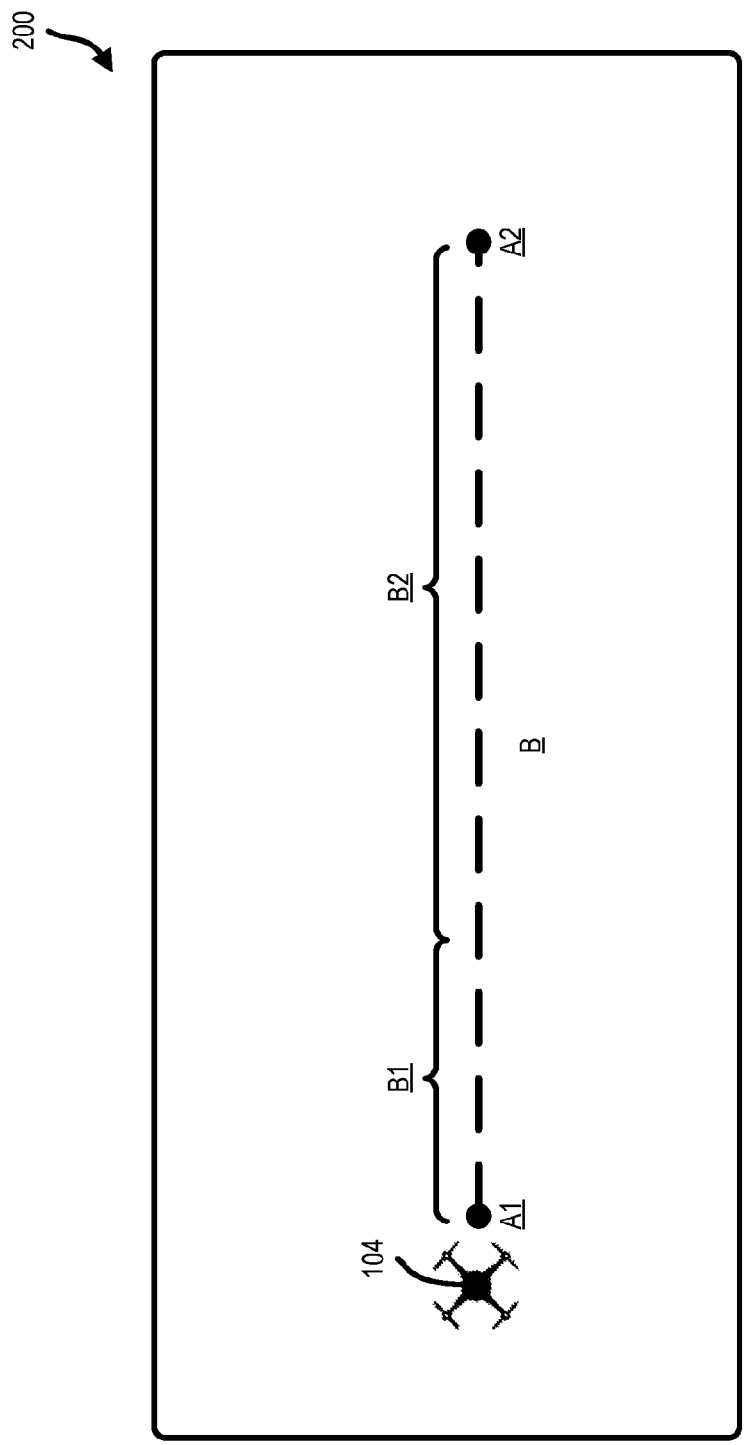
FIG. 2 illustrates an example flight plan with a set of coordinates according to one embodiment.

Throughout this description, a flight plan may be also referred to as a flight mission and may include one or more points of a path (e.g., a starting point, an ending point, and/or a set of waypoints, where each are defined by longitudinal and latitudinal coordinates), a set of velocities, a set of altitudes, a set of headings/directions, a set of events (e.g., capture video at prescribed times or locations, hover over an area for a specified interval, etc.), a time/expiration/duration, and a set of restricted zones/areas. For instance, the flight plan 200 shown in FIG. 2 includes the flight path B. The flight path B indicates that the UAV 104 is to take off from location A1 (corresponding to a first set of longitude and latitude coordinates) and travel to location A2 (corresponding to a second set of longitude and latitude coordinates) using the path B. The path B may be separated into the segments B1 and B2. In this scenario, the UAV 104 is restricted to an altitude between 300 feet and 400 feet and a velocity of 100 miles/hour during segment B1 and an altitude between 350 feet and 400 feet and a velocity of 90 miles/hour during segment B2. The above altitude and velocity limitations are merely exemplary and in other embodiments higher altitude and velocity limitations may be assigned/issued for a UAV 104 (e.g., altitude limitations above 400 feet and velocity limitations above 100 miles/hour).

Figure 3:
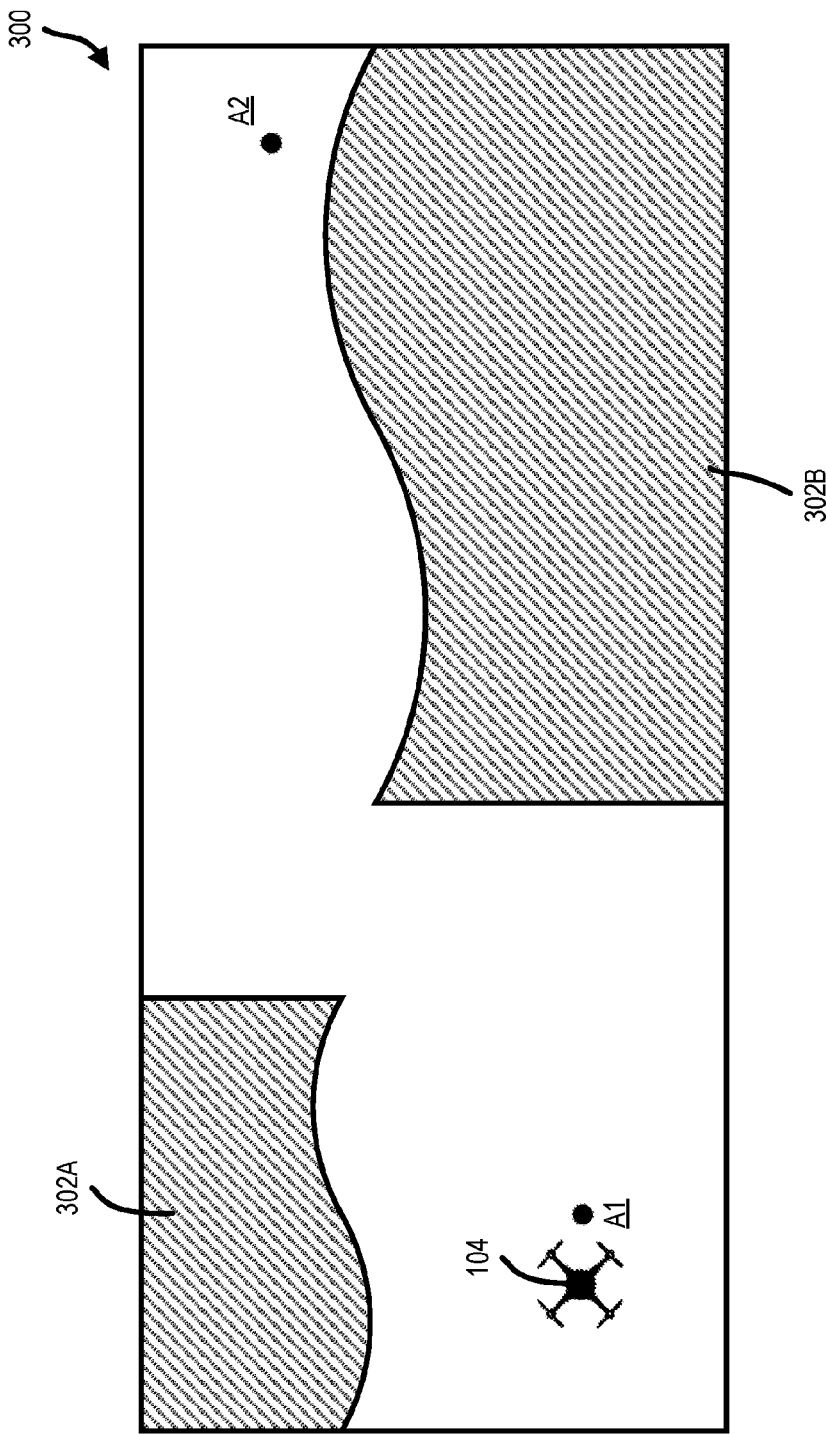
FIG. 3 illustrates an example flight plan with a set of restricted areas/zones according to one embodiment.

In another example, as shown in FIG. 3, a flight plan 300 may indicate that the UAV 104 is to take off from location A1, travel to location A2, and avoid a set of restricted zones 302A and 302B. In this example, the UAV 104 is directed to reach the target location A2 without entering the set of restricted zones 302A and 302B. The restricted zones may be relative to geographical location (defined by a set of coordinates), an altitude, and/or a velocity. For example, the UAV 104 may be permitted to enter restricted zone 302A but only at a prescribed altitude and/or only at a prescribed velocity.

Figure 4:
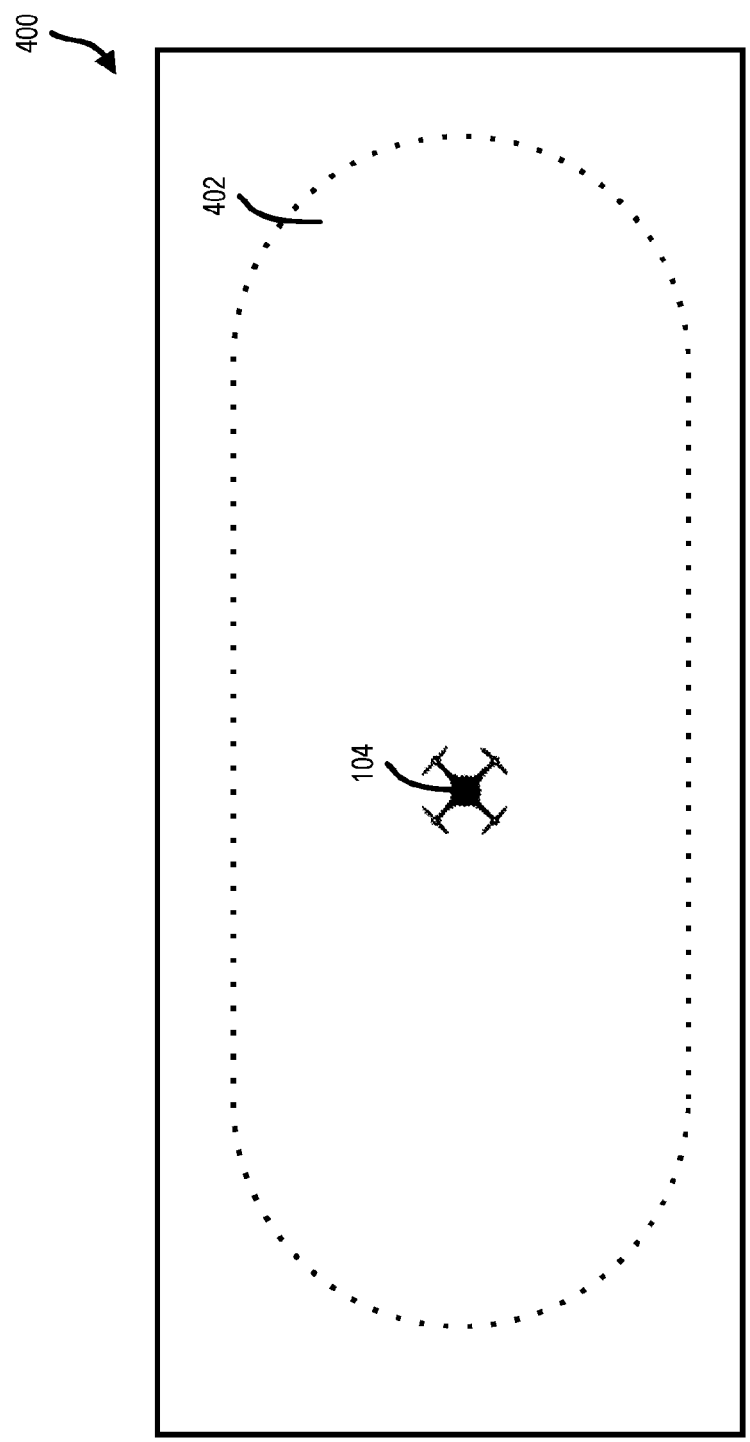
FIG. 4 illustrates an example flight plan with a designated clearance zone according to one embodiment.

In still another example, shown in FIG. 4, a flight plan 400 may provide clearance for the UAV 104 to fly in a designated clearance zone 402. The clearance zone 402 may be a confined area associated with an altitude range (e.g., between 400-500 feet) and/or an expiration/duration (e.g., an expiration of 11:40 PM). In this example, the UAV 104 may fly anywhere in the designated clearance zone 402 until the clearance has expired.

Although the flight plans described above are provided in relation to diagrams, flight plans may be encoded/presented using any format. For example, a flight plan may be represented and passed to the UAV 104 using an extensible markup language (XML) based format or another encoding or representation that is decodable and parseable by a machine.

Figure 5:
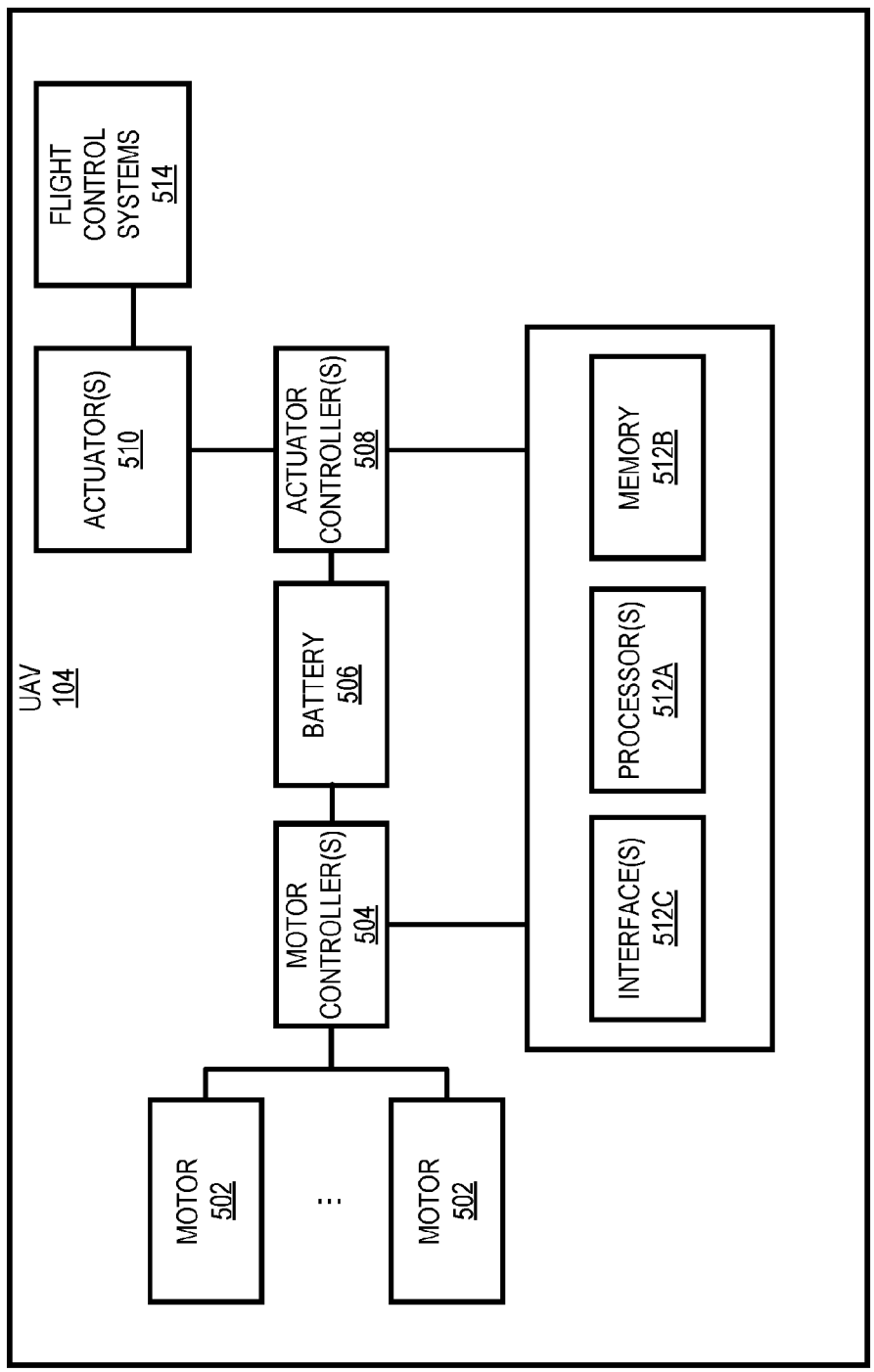
FIG. 5 illustrates a block diagram of a UAV according to one embodiment.

FIG. 5 shows a block diagram of a UAV 104 according to one example embodiment. Each element of the UAV 104 will be described by way of example below and it is understood that each UAV 104 may include more or less components than those shown and described herein.

As shown in FIG. 5, a UAV 104 may include a set of motors 502 controlled by one or more motor controllers 504, which control the speed of rotation of the motors (e.g., rounds per minute). As used herein, the term engine may be used synonymously with the term motor and shall designate a machine that converts one form of energy into mechanical energy. For example, the motors 502 may be electrical motors that convert electricity stored in the battery 506 into mechanical energy. The UAV 104 may include any number of motors 502 that are placed in any configuration relative to the body and/or an expected heading of the UAV 104. For example, the motors 502 may be configured such that the UAV 104 is a multirotor helicopter (e.g., a quadcopter). In other embodiments, the motors 502 may be configured such that the UAV 104 is a fixed wing aircraft (e.g., a single engine or dual engine airplane). In these embodiments, the motors 502, in conjunction with other elements of the UAV 104 serve to keep the UAV 104 in flight and/or propel the UAV 104 in a desired direction. In some embodiments, the UAV 104 may not include motors 502 for propelling the UAV 104 forward. In this embodiment, the UAV 104 may be a glider or lighter-than-air craft (e.g., a weather balloon).

As noted above, the motors 502 are controlled by one or more motor controllers 504, which govern the speed of rotation of each motor 502. In one embodiment, the motor controllers 504 may work in conjunction with actuator controllers 508 and actuators 510 that control the pitch/angle/rotation of propellers, flaps, slats, slots, rotors, rotor blades/wings, and other flight control systems 514. The motor controllers 504 and actuator controllers 508 may be managed/controlled by one or more processors 512A that are communicatively coupled to a memory 512B and one or more interfaces 512C.

In some embodiments, the memory 512B may store instructions that when executed by the processors 512A cause the UAV 104, via adjustments to settings/parameters of the motor controllers 504 and actuator controllers 508, to move in a particular direction (vertical or horizontal) or maintain a particular flight pattern (e.g., hover at a particular altitude).

The UAV 104 may communicate with one or more other devices using the one or more interfaces 512C. In one embodiment, one of the interfaces 512C in a UAV 104 may comply with a 3GPP protocol. For example, an interface 512C may adhere to one or more of Global System for Mobile communication (GSM) (including General Packet Radio Service (GPRS) and Enhanced Data Rates for GSM Evolution (EDGE)), UMTS (including High Speed Packet Access (HSPA)), and Long-Term Evolution (LTE). In some embodiments, one or more interfaces 512C in the UAV 104 may allow a UAV operator 106 and/or other parts of the UTM system 100A to control or provide plans/instructions to the UAV 104.

In one embodiment, the UAV 104 may operate in the Evolved Universal Mobile Telecommunications System (UMTS) Terrestrial Radio Access Network (E-UTRAN) 118A, the Universal Terrestrial Radio Access Network (UTRAN) 118B, and/or the GSM EDGE Radio Access Network (GERAN) 118C using one or more of the interfaces 512C. The E-UTRAN 118A, the UTRAN 118B, and/or the GERAN 118C may be administered by a network operator (e.g., a cellular network operator) and the UAV 104 may be a subscriber to one or more of these networks 118A, 118B, and 118C. The E-UTRAN 118A, the UTRAN 118B, and/or the GERAN 118C may comprise various network devices. Each of the network devices may, in some embodiments, be electronic devices that can be communicatively connected to other electronic devices on the network (e.g., other network devices, user equipment devices (such as the UAV 104), radio base stations, etc.). In certain embodiments, the network devices may include radio access features that provide wireless radio network access to other electronic devices such as user equipment devices (UEs) (for example a "radio access network device" may refer to such a network device). For example, the network devices may be base stations, such as an eNodeB in Long Term Evolution (LTE), a NodeB in Wideband Code Division Multiple Access (WCDMA), or other types of base stations, as well as a Radio Network Controller (RNC), a Base Station Controller (BSC), or other types of control nodes. Each of these network devices that include radio access features to provide wireless radio network access to other electronic devices may be referred to as cells, towers, cellular towers, or the like. In some embodiments, an interface 512C in a UAV 104 may assist in estimating a geographical location of the UAV 104 based on communications within the E-UTRAN 118A, the UTRAN 118B, and/or the GERAN 118C.

A UAV operator 106 may maintain a connection with a corresponding UAV 104 via connection 134. The connection 134 may be established through one or more interfaces 512C and may form a wireless command and control (C2) connection that allows the UAV operator 106 to control the UAV 104 through direct commands and/or through issuance of a flight plan. In some embodiments, the connection 134 may additionally allow the UAV operator 106 to receive data from the UAV 104. For example, the data may include images, video streams, telemetry data, and system status (e.g., battery level/status). In some embodiments, the connection 134 may be a point-to-point (e.g., mesh) connection while in other embodiments the connection 134 between the UAV operator 106 and the UAV 104 may be part of a distributed network. In one embodiment, the connection 134 is separate from the access networks E-UTRAN 118A, UTRAN 118B, and GERAN 118C while in other embodiments the connection 134 is part of one of the access networks E-UTRAN 118A, UTRAN 118B, and GERAN 118C.

In one embodiment, the UAV operator 106 may maintain a connection with other elements of the UTM system 100A. For example, the UAV operator 106 may maintain connection 136 with a UAV Service Supplier (USS) 120. In some embodiments, the connection 136 may be a point-to-point connection while in other embodiments the connection 136 may be part of a distributed network. In one embodiment, the connection 136 is separate from the access networks E-UTRAN 118A, UTRAN 118B, and GERAN 118C while in other embodiments the connection 136 is part of one of the access networks E-UTRAN 118A, UTRAN 118B, and GERAN 118C.

In one embodiment, the UAV 104 may maintain a connection with the USS 120. For example, the UAV 104 may maintain the connection 138 with USS 120. In some embodiments, the connection 138 may be a point-to-point connection while in other embodiments the connection 138 may be part of a distributed network. In one embodiment, the connection 138 is separate from the access networks E-UTRAN 118A, UTRAN 118B, and GERAN 1118C while in other embodiments the connection 138 is part of one of the access networks E-UTRAN 118A, UTRAN 118B, and GERAN 118C. In one embodiment, the connection 138 may allow the transmission of one or more pieces of data to the USS 120, including telemetry, authentication/authorization (e.g., using a subscriber identity/identification module (SIM) based identity to check UAV 104 registrations and authorizations), reports and logs (e.g., to establish liability in case of accidents), and commands to ensure compliance and safety (e.g., land immediately). The connection 138 may alternatively provide access to a data center to provide storage for the UAV 104 (e.g., storage of video streams or images captured by the UAV 104).

In one embodiment, the connection 136 allows the UAV operator 106 to transmit data to or receive data from the USS 120 regarding a current, past, or future flight. For instance, the connection 136 may allow the UAV operator 106 to convey to the USS 120 one or more of the following: airspace information, alarms and notifications, authentication/authorization (e.g., use of a subscriber identity module (SIM) based identity to check UAV 104 and pilot/UAV operator 106 registrations and authorizations), and reports and logs (e.g., to establish liability in case of accidents).

In some embodiments, the UAV operator 106 may transmit a proposed flight plan to the USS 120 via the connection 136. In one embodiment, the UTM system 100A may include a plurality of USSs 120. The set of USSs 120 may alternatively be referred to as a USS network. Each USS 120 offers support for safe airspace operations based on information received from a set of stakeholders and other information sources. The USSs 120 may share information about their supported operations to promote safety and to ensure that each USS 120 has a consistent view of all UAV 104 operations and thus enable the UAVs 104 to stay clear of each other.

As noted above, the USSs 120 may receive information from a variety of stakeholders and information sources such that the USSs 120 may determine whether a proposed flight plan is authorized to proceed. For example, the Federal Aviation Association (FAA) may provide directives and constraints to the USSs 120 via the Flight Information Management System (FIMS) 122. The FIMS 122 provides administration officials a way to issue constraints and directives to the UAV operators 106 and/or the UAV 104 via a USS 120. Such constraints and directives may be based on information received from the National Airspace System (NAS) Air Traffic Management (ATM) system 124 and/or other NAS data sources 126. In this example, the ATM system 124 could be used to mark certain restricted areas (e.g., airports and military bases) for the UAV 104 or restrict flights over forest fire areas or other spaces which are normally permitted for the UAV 104. In addition to the airspace state and other data provided by the ATM system 124 and other NAS data sources 126, the FIMS 122 may provide impact data, which may describe effects caused by the UAV 104 to a common airspace. Although described in relation to U.S. regulatory authorities, the systems and methods described herein may be similarly applied using any regulatory authority/agency overseeing any jurisdiction/territory/airspace.

In addition to constraints and directives received from the FIMS 122, the USSs 120 may receive data from supplemental data service providers 128. These supplemental data service providers 128 may provide various pieces of data that are used by the USSs 120 in planning and authorizing a flight plan, including terrain, weather, surveillance, and performance information. The supplemental data service providers 128 may communicate amongst each other to insure consistency and accuracy of information. In some embodiments, the supplemental data service providers 128 may provide data that is presented/transmitted to UAV operators 106 via the USS 120 for the planning of a flight plan/mission.

In some embodiments, as will be described in greater detail below, a Network Coverage and Policy Server (NCPS) 102 in the 3GPP system 100B may provide network connectivity and/or policy information to a component of the UTM system 100A, including one or more of the USS 120, the UAVs 104, and the UAV operators 106 via the Rx or another interface. For example, the information may include a three-dimension map that is defined by a set of volume elements. In this example configuration, volume elements correspond to different portions of a geospatial area and are associated with network connectivity information (e.g., network signal strength, signal to noise ratio (SNR) and/or network coverage classes/indicators (e.g., no coverage, good coverage, poor coverage, etc.)) and/or network policy information (e.g., usage/permission information). As will be described in greater detail below, this network connectivity and/or policy information may be used by the USS 120, UAVs 104, and/or the UAV operators 106 for planning and adjusting flights of UAVs 104 to ensure UAVs 104 have adequate network connectivity throughout a flight.

In some embodiments, the USSs 120 may receive constraints from public safety sources 130. This information may limit UAV 104 missions over areas when such flights may negatively affect public safety. For example, UAV 104 missions may be limited over areas that are currently hosting events with large crowds of people. In some embodiments, the public safety sources 130 may provide data that is presented/transmitted to UAV operators 106 via the USS 120 for the planning of a flight plan/mission. The USSs 120 may also make UAV 104 flight/operation information available to the public 132.

In some embodiments, network connectivity and/or policy information may be determined and/or recorded per subscription level/class of a UAV 104. In these embodiments, the 3GPP system 100B may consult with the User Data Repository (UDR)/Subscriber Profile Repository (SPR) 142 of determining subscription level/class information associated with UAVs 104.

As noted above, the USS 120 may determine if a proposed flight plan is authorized in view of directives, constraints, and information received from various stakeholders/sources (e.g., network connectivity and/or policy information received from the NCPS 102). After concluding that the proposed flight plan is authorized or not authorized to proceed, the USS 120 may transmit a response to the UAV operator 106. In response to receiving an authorized flight plan, the UAV operator 106 may begin controlling the UAV 104 to effectuate the authorized flight plan or the UAV operator 106 may transmit the authorized flight plan or some set of instructions describing the objectives of the authorized flight plan to the UAV 104. Based on inputs from the UAV operator 106, the processor 512A together with instructions stored in the memory 512B may control the motor controllers 504 and/or actuators 510 to achieve the objectives of the flight plan. In one embodiment, the network connectivity and/or policy information may be provided for storage on the UAV 104 such that the UAV 104 may autonomously alter the flight plan without intervention from other components of the UTM system 100A.

As shown in FIG. 1 and described above, communication of the network connectivity and/or policy information may be carried out over an Rx interface. In one embodiment, the UTM system 100A may poll the NCPS 102 of the 3GPP system 100B at prescribed intervals or upon request from the USS 120 and/or a UAV operator 106. In addition to extension of the Rx interface, other components of the 3GPP system 100B may be extended to support interfacing with the UTM system 100A.

In one embodiment, the NCPS 102 may be coupled to one or more controllers 116. For example, the NCPS 102 may be coupled to 2G Serving General Packet Radio Service (GPRS) Support Node (SGSN) 116A and/or a 2G Mobile services Switching Centre (MSC) 116B corresponding to a GSM EDGE Radio Access Network (GERAN) 118C. In this embodiment, the 2G-SGSN 116A may communicate with the GERAN 118C via the Gb interface and the 2G-MSC 116B may communicate with the GERAN 118C via the A interface. The 2G-SGSN 116A and the 2G-MSC 116B may assist in managing charging/billing, location request management, authorization of location services, general operation of location services, and determining network connectivity and/or policy information for the GERAN 118C.

In some embodiments, the NCPS 102 may be coupled to a 3G-SGSN 116C and/or an MSC server 116D corresponding to a Universal Terrestrial Radio Access Network (UTRAN) 118B. In this embodiment, the 3G-SGSN 116C and the MSC server 116D may communicate with the UTRAN 118B via the Iu interface. The 3G-SGSN 116C and the MSC server 116D may manage charging/billing, location request management, authorization of location services, general operation of location services, and determining network connectivity and/or policy information for the UTRAN 118B.

In some embodiments, the NCPS 102 may be coupled to a Mobility Management Entity (MME) 116E corresponding to an Evolved Universal Mobile Telecommunications System (UMTS) Terrestrial Radio Access Network (E-UTRAN) 118A. In this embodiment, the MME 116E may communicate with the E-UTRAN 118A via the S1 interface. The MME 116E may manage charging/billing, location request management, general operation of location services, and determining network connectivity and/or policy information for the E-UTRAN 118A.

Each of the access networks GERAN 118C, UTRAN 118B, and E-UTRAN 118A may be composed of various network elements that act as attachment points for UEs, including the UAVs 104. For example, the access networks GERAN 118C, UTRAN 118B, and E-UTRAN 118A may each include one or more cells 140. In some embodiments, the cells 140 may be enhanced nodeBs (eNodeBs) and/or a radio base station (RBSs).

Figure 6:
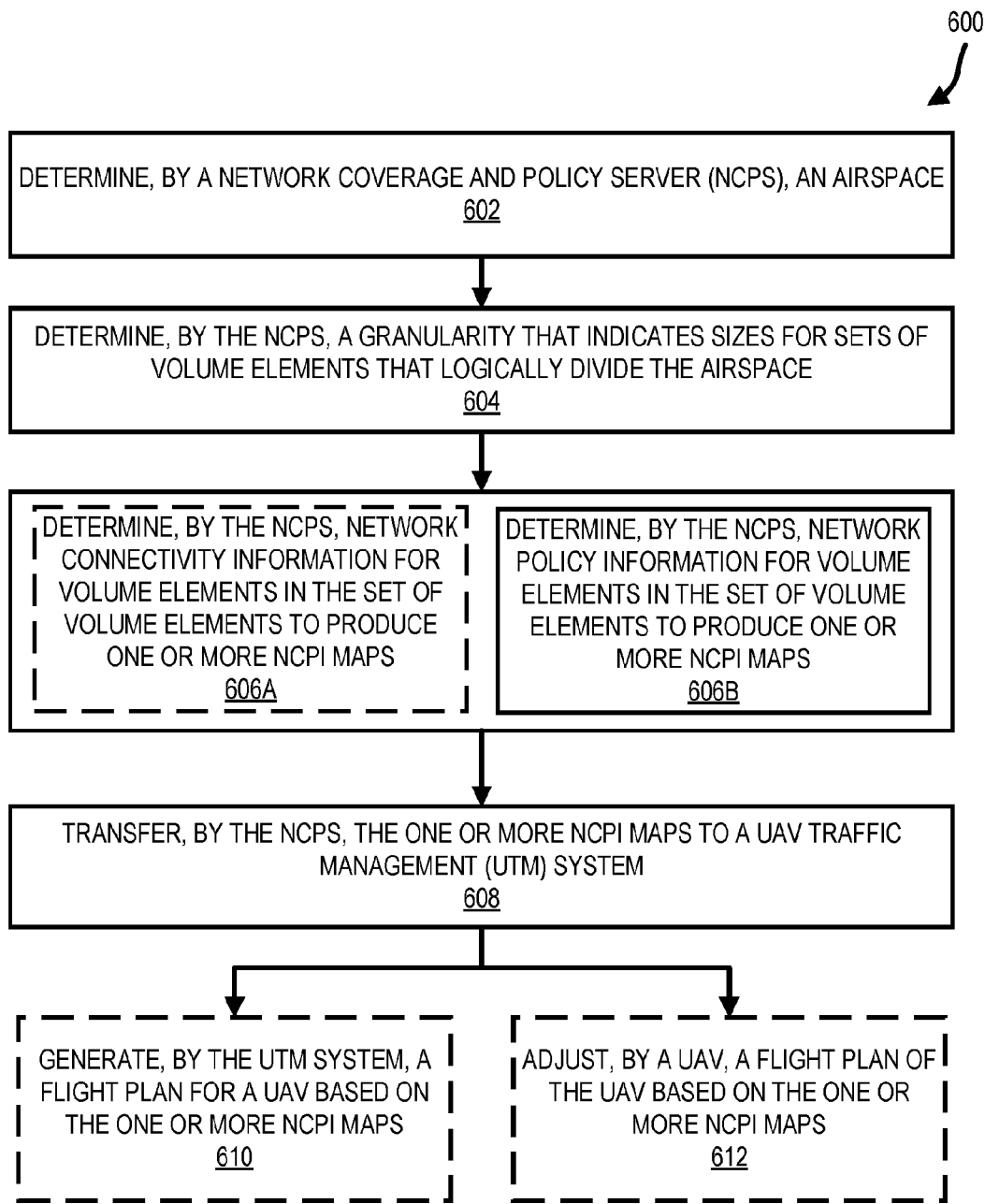
FIG. 6 illustrates a method for generating and using a three-dimensional map that includes network connectivity and/or policy information for an airspace according to one embodiment.

Turning now to FIG. 6, an example method 600 according to one embodiment will be discussed for generating and using a set of three-dimensional NCPI maps, which each include network connectivity and/or policy information for an airspace (i.e., a three-dimensional geospatial area). The operations in the diagram of FIG. 6 will be described with reference to the exemplary implementations of the other figures. However, it should be understood that the operations of the diagram can be performed by implementations other than those discussed with reference to the other figures, and the implementations discussed with reference to these other figures can perform operations different than those discussed with reference to the diagram. Although described and shown in FIG. 6 in a particular order, the operations of the method 600 are not restricted to this order. For example, one or more of the operations of the method 600 may be performed in a different order or in partially or fully overlapping time periods. Accordingly, the description and depiction of the method 600 is for illustrative purposes and is not intended to restrict to a particular implementation.

Figure 7:
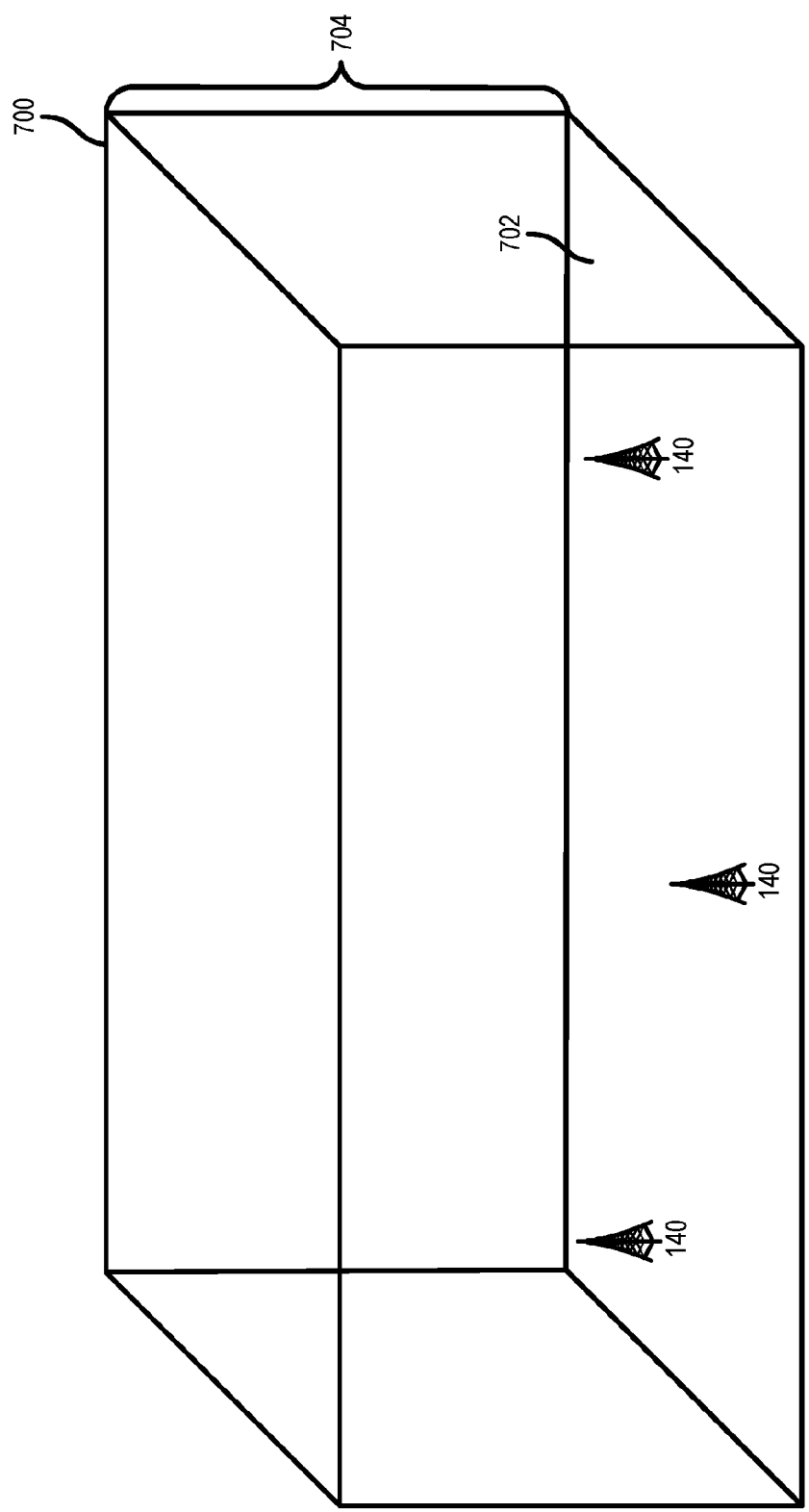
FIG. 7 illustrates a three-dimensional geospatial area in which a set of cells are located according to one embodiment.

The method 600 may commence at operation 602 with the NCPS 102 determining an airspace of interest. The airspace may be a three-dimensional geospatial area in which network connectivity and/or policy information will be determined. For example, FIG. 7 shows a three-dimensional airspace 700 in which a set of cells 140, which provide network connectivity to user equipment, are located. As shown in FIG. 7, the three-dimensional airspace 700 includes a two-dimensional area 702 and a specified altitude 704 above the two-dimensional area 702. For example, the two-dimensional area 702 may correspond to a park and the altitude 704 may be one-thousand feet above the park (i.e., the two-dimensional area 702). In one embodiment, the NCPS 102 determines the airspace 700 based on a request from a UAV operator 106, a USS 120, or another component of the UTM system 100A. For example, in preparation for a flight by a UAV 104 in the airspace 700, a UAV operator 106 or a USS 120 may transmit a request for network connectivity and/or policy information to the NCPS 102. The request may include information identifying the airspace 700 (e.g., latitude and longitude information of the two-dimensional area 702; latitude, longitude, and altitude information of one or more points within, or defining corners/edges/boundaries of, the airspace 700, etc.).

In the description below, the airspace 700 of FIG. 7 will be used to explain the operations of the method 600. However, the use of the airspace 700 is purely for illustrative purposes and does not limit the operation of the method 600. For example, although shown as the airspace 700 defined by a cuboid, the airspace 700 may be defined by any set of three-dimensional shapes or set of three-dimensional bounded areas.

As shown in FIG. 7 and described above, the airspace 700 includes cells 140, which provide network connectivity to user equipment, including UAVs 104, operating in the airspace 700. In one embodiment, the cells 140 provide network connectivity for a single network while in other embodiments, the cells 140 in the airspace 700 provide network connectivity for multiple networks. The multiple networks may be managed by a single network operator or multiple network operators. For example, a first network managed by a first network operator may implement a particular network technology (e.g., 2G, 3G, 4G, 5G, narrowband Internet of Things (NB-IoT), LoRa, WiFi, satellite, etc.), while a second network managed by a second network operator may implement another network technology. Accordingly, the cells 140 in the airspace 700 may provide network connectivity for networks implementing various network technologies and may be managed by various network operators. Further, although the cells 140 are shown as being located within the airspace 700, in some embodiments, cells 140 may alternatively or additionally be located outside the airspace 700 but are proximate to the airspace 700 such that these cells 140 provide network coverage to user equipment (e.g., UAVs 104) operating within the airspace 700.

Figure 8:
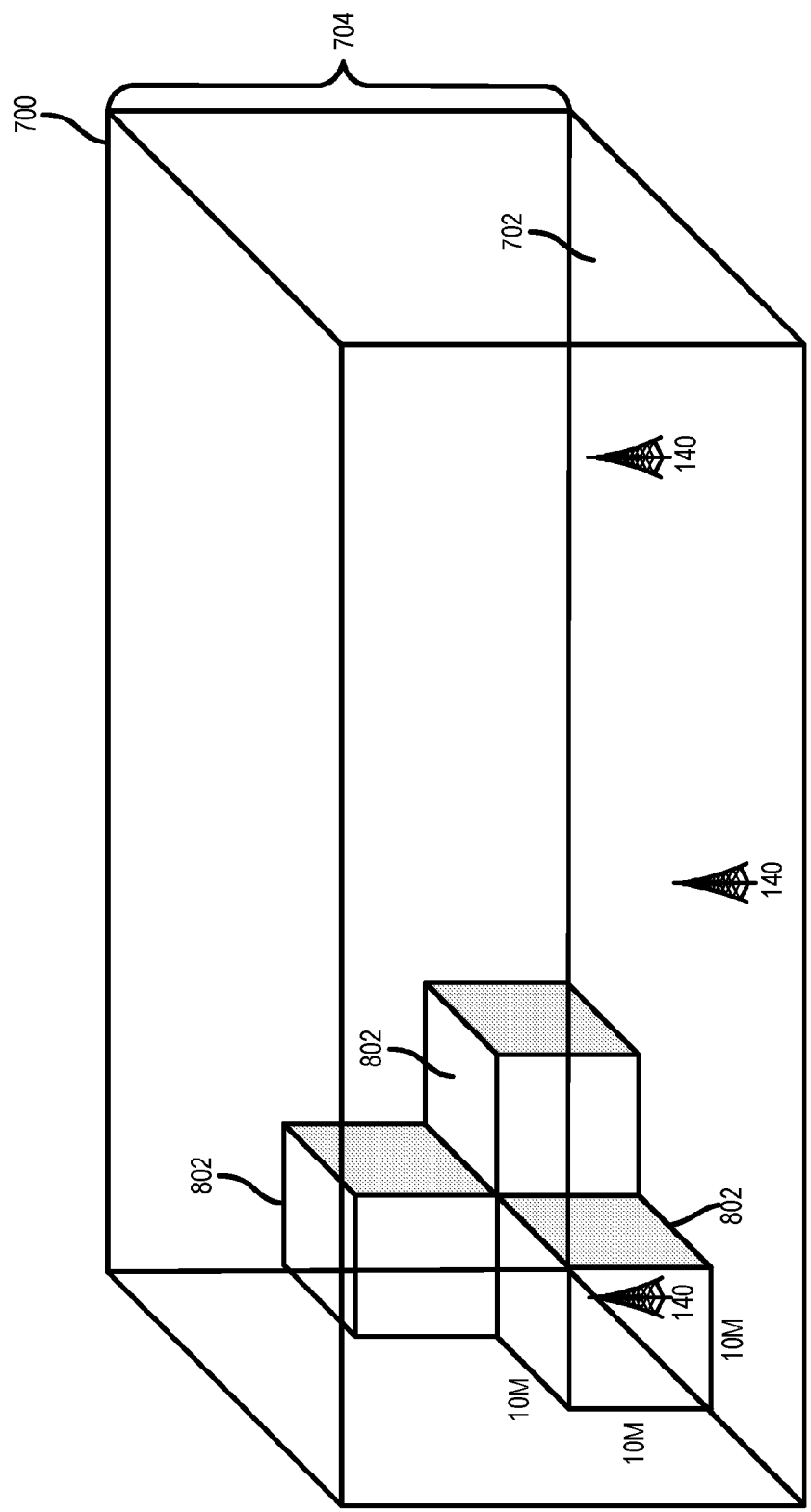
FIG. 8 shows a set of volume elements with a uniform size within the three-dimensional geospatial area according to one embodiment.

At operation 604, the NCPS 102 determines a granularity for the airspace 700. The granularity may indicate the logical separation of the airspace 700 and the corresponding level of detail that will be used for determining network connectivity and/or policy information for the airspace 700. In one embodiment, the granularity may be represented as the shape and/or dimensions of a set of volume elements (e.g., voxels or three-dimensional shapes) that fill the airspace 700 determined at operation 602. For example, FIG. 8 shows a set of volume elements 802 corresponding to a granularity determined at operation 604. As shown, the granularity determined at operation 604 may be for cube volume elements 802 with ten-meter dimensions (i.e., ten meters× ten meters×ten meters); however, any size volume elements 802 may be determined/set by the NCPS 102 at operation 604. Since, as will be described below, the network connectivity and/or policy information will be determined per volume element 802, larger volume elements 802 provide less granular network connectivity and/or policy information for the airspace 700, while smaller volume elements 802 provide more granular network connectivity and/or policy information for the airspace 700. In this fashion, a network operator can control the detail of information that is provided to the UTM system 100A (e.g., a USS 120, a UAV operator 106, and/or a UAV 104) by adjusting/selecting appropriate granularities at operation 604.

Figure 9:
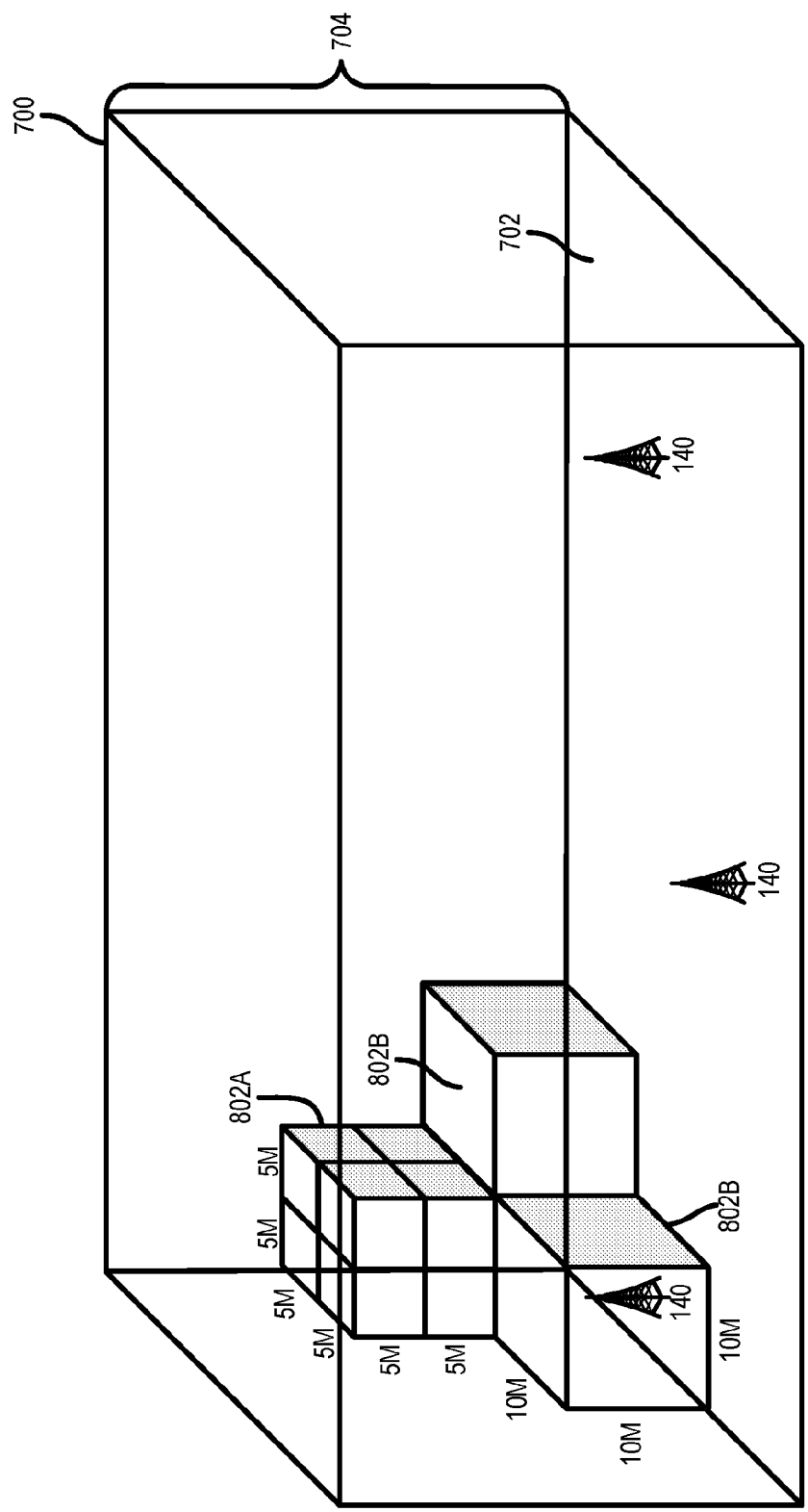
FIG. 9 shows a set of volume elements with a non-uniform size within the three-dimensional geospatial area according to one embodiment.

Although all volume elements 802 in FIG. 8 are shown as having equal shapes and dimensions, in some embodiments, the NCPS 102 may determine different granularities for different or the same portions of the airspace 700. For example, as shown in FIG. 9, a first portion of the airspace 700 may correspond to volume elements 802A with five-meter dimensions (i.e., five meters×five meters×five meters) while a second portion of the airspace 700 may correspond to volume elements 802B with ten-meter dimensions (i.e., ten meters×ten meters×ten meters). This non-uniform size of volume elements 802 provides more granular network connectivity and/or policy information for some portions of the airspace 700 while providing less granular network connectivity and/or policy information for other portions of the airspace 700. This variability in the definition of volume elements 802 is useful to keep network connectivity and/or policy information compact for less critical portions of the airspace 700 while allowing more details to be provided for more critical portions of the airspace 700 (e.g., closer to the ground or close to cells 140). Further, this variability in the definition of volume elements 802 may be used by network operators to provide differing levels of network connectivity and/or policy information to various elements of the UTM system 100A. For example, the USS 120 may be provided with less detailed network connectivity and/or policy information than the UAV 104. Thus, in some embodiments, volume elements (e.g., of one granularity) may overlap with one or more other volume elements (e.g., of a different granularity). For example, a particular volume element 802B with ten-meter dimensions in a portion of the airspace 700 may overlap with eight volume elements 802A with five-meter dimensions in the same portion of the airspace 700, such that the USS 120 may be provided with less detailed network connectivity and/or policy information (from the larger volume element 802B) than the network connectivity and/or policy information (from one or more of the smaller volume elements 802A) provided to the UAV 104. An example of less detailed network connectivity information is an average SNR calculated throughout the ten-meter dimensions of volume element 802B in comparison to the more detailed network connectivity information of differing (possibly widely) average SNRs calculated within the five-meter dimensions of the individual eight volume elements 802A in the same portion of the airspace 700.

Although shown and described as volume elements 802 being in the shape of cubes, the airspace 700 may be divided using any set of shapes. For example, spheres, cylinders, cuboids, cones, tetrahedrons, or any other three-dimensional shape may be used in place of or in conjunction with cubes to logically divide the airspace 700 for the purpose of generating network connectivity and/or policy information.

At operations 606A and/or 606B, the NCPS 102 determines network connectivity and/or policy information for volume elements 802 in the airspace 700. In particular, at operation 606A, the NCPS 102 may determine network connectivity information for volume elements 802 in the airspace 700 while at operation 606B, the NCPS 102 may determine network policy information for volume elements 802 in the airspace 700. The operations 606A and 606B may be performed at the same time or may be performed separately. In one embodiment, the collective network connectivity and/or policy information for the volume elements 802 in the airspace 700 may be represented or collectively referred to as a network connectivity and policy information (NCPI) map. The NCPI map may be represented in any machine parseable form, including using Extensible Markup Language (XML). For example, a volume element 802 may be described in an element of an XML document and each volume element 802 element may include one or more sub-elements that define the network connectivity and policy information. In one embodiment, the data structure that represents the NCPI map (e.g., a XML document) may include a header, which is used for defining/describing network connectivity and/or policy information in the NCPI map. For example, the header may indicate the sizes of volume elements 802 (i.e., granularity information), the size and/or location of the airspace 700 (i.e., properties of the airspace 700), encoding schemes used in the NCPI map (e.g., encoding schemes used to represent the network connectivity and/or policy information in the NCPI map), etc.

In one embodiment, the NCPS 102 determines network connectivity and/or policy information for the NCPI map based on readings/inputs from cells 140 and/or characteristics of cells 140. For example, the network connectivity and/or policy information may be determined based on one or more of the location of cells 140, antenna orientation and characteristics associated with cells 140, and terrain and building locations and characteristics between cells 140. In one embodiment, the accuracy of the network connectivity and/or policy information may be further increased by simulating signal propagation and/or by retrieving actual signal measurements from UAVs 104 flying through portions of the airspace 700. For example, an NCPI map may be initially generated based on readings/inputs from and/or characteristics of cells 140. This initial NCPI map may be refined by modeling/simulating complex environments (e.g., city centers) within the airspace 700. This refined NCPI map may be further refined and validated by measurements with actual UAV 104 flights. In particular, during regular operation, UAVs 104 may report radio signal measurements to the 3GPP system 100B (e.g., the NCPS 102) that may be taken into account to refine or update NCPI maps.

The network connectivity information provided within an NCPI map per volume element 802 may include measurements (e.g., radio signal strength or signal to noise ratio) and/or connectivity quality classes (e.g., "no network coverage", "good network coverage", "poor network coverage", etc.). Providing connectivity quality classes has the benefit of allowing the network operator to adjust the level of detail disclosed to the UTM system 100A and also makes the NCPI map more compact, requiring less storage capacity and bandwidth for conveyance to the UTM system 100A. For example, in one embodiment, network connectivity information in a volume element 802 may be represented with a single bit, where "0" corresponds to "no network coverage" in that volume element 802, while "1" denotes "network coverage" in that volume element 802. Accordingly, as illustrated herein, to optimize storage capacity and bandwidth, the network coverage and/or policy information for a volume element 802 may be encoded using a minimum number of bits. In this embodiment, a reference key for interpreting the encoded bits may be provided in a header of the NCPI map (e.g., a separate element at the beginning of a XML document representing the NCPI map).

In one embodiment, multiple NCPI maps may be generated by the NCPS 102 for the same airspace 700. For example, each NCPI map in a set of NCPI maps may correspond to a different network technology (e.g., 2G, 3G, 4G, 5G, narrowband Internet of Things (NB-IoT), LoRa, WiFi, satellite, etc.). By providing separate NCPI maps per network technology, the NCPS 102 allows the UTM system 100A to request/use just those NCPI maps that correspond to network technologies supported by particular UAVs 104. Further, since some network systems may be available in different portions of the airspace 700, the separation of network technologies into separate NCPI maps allows the UTM system 100A to schedule in-flight switches between different network systems prior to the flight of a UAV 104. In some embodiments, a header of each NCPI map may include access information (e.g., credentials) corresponding to the network systems represented by the NCPI map. This access information may be used by a UAV 104 to connect to the network systems represented by the NCPI map.

In addition to network technologies, the NCPI maps may be separated or may include information distinguishing frequency bands in the same network technology (e.g., separate bands provided by different network operators and corresponding network systems). This frequency band distinguishing may be used to pre-plan a UAV 104 to switch bands and/or network operators during flight. Further, this frequency band information may be used to manage radio resources and mitigate interference. For example, certain portions of a network system may reserve particular frequency bands for UAVs 104, while other frequency bands may not have any restriction on use in the network system.

In another example, each NCPI map in a set of NCPI maps may correspond to a different granularity for logical division of the airspace 700 (e.g., one NCPI map for volume elements 802A with five-meter dimensions, another NCPI map for volume elements 802B with ten-meter dimensions). The NCPI maps for different granularities may be used to provide differing levels of network connectivity and/or policy information to various elements of the UTM system 100A.

In one embodiment, as noted above, network policy information may also be provided per volume element 802 in an NCPI map. For example, a network operator may not want UAVs 104 to connect to a network system from particular locations (e.g., coverage around base station antennas may be unstable). Thus, volume elements 802 may be tagged as "do not use", which indicates to the UTM system 100A to not schedule use in particular portions of the airspace 700 corresponding to these volume elements 802. In some embodiments, certain portions of the airspace 700 may be unchartered (i.e., no network connectivity information has been determined). In these embodiments, volume elements 802 may be marked "unmapped". Portions of the airspace 700 with corresponding volume elements 802 marked as "do not use" or "unmapped" may be avoided by the UTM system 100A when planning a flight for a UAV 104. Similarly, network providers may configure a network system to encourage use by UAVs 104 in certain bands or portions of the network system/airspace 700 (e.g., UAV 104 highways). In particular, network operators may configure network systems to provide optimized coverage for UAVs 104 along particular paths through the airspace 700 and/or on particular bands. In these embodiments, volume elements 802 may be tagged as a "preferred connection", indicating that UAVs 104 crossing the portion of the airspace 700 corresponding to these volume elements 802 should attempt to take a flight path that traverses these volume elements 802. This preference may correspond to in flight decisions/deviations on the part of the UAV 104 (e.g., upon encountering an unanticipated event) and/or pre-flight planning decisions by the USS 120.

As noted above, in one embodiment, the network connectivity information may indicate different classes of connectivity needed by UAVs 104. For example, volume elements 802 may indicate whether network resources present/available in the portion of the airspace 700 covered by the volume element 802 can provide a command and control channel and/or a data payload channel (e.g., a streaming channel). While a command and control channel may require reliable connectivity, this type of channel will convey a relatively low amount of data. In contrast, a data payload channel may need significant bandwidth (e.g., to stream video). Accordingly, the network connectivity information indicates whether the network resources present/available in the portion of the airspace 700 covered by the volume element 802 can provide a command and control channel and/or a data payload channel Although described in relation to command and control and data payload channels, the network connectivity information may indicate the availability of any type of channel or set of network resources.

In some embodiments, network operators may be most concerned about bandwidth intensive applications, as large bandwidth usage may cause the most interference in the network system. To control network usage, the NCPI map can be used to indicate network usage policies by distinguishing coverage/availability for the various UAV 104 communication channels. For example, a volume element 802 may be marked as "command and control only" meaning that in a particular portion of the airspace 700 covered by the volume element 802, UAVs 104 may only use the network for communication over their command and control channel. In another example, a volume element 802 may be marked as "command and control or data payload", meaning that in a particular portion of the airspace 700 covered by the volume element 802, UAVs 104 may use both their command and control channel and the data payload channel.

In some embodiments, the network policy information may indicate that all traffic or particular types of traffic are to be offloaded to particular technologies (e.g., WiFi). For example, one or more volume elements 802 may indicate that video streams are restricted to WiFi. In this example, command and control channels may be allowed to use a cellular network (e.g., a Long Term Evolution (LTE) network), while a data payload channel (e.g., sensor data collection that may provide sporadic bulk data transfer) is restricted to a local area network (e.g., WiFi).

To motivate adherence to certain policies, network operators may charge different rates for different network usage behaviors. For instance, use of network resources in particular portions of the airspace 700 may be associated with higher charges than other portions of the airspace 700. For example, a UAV operator 106 may be charged a higher rate for a UAV 104 accessing network resources in a portion of the airspace 700 that is marked as a "premium connection" in a corresponding volume element 802 than when the UAV 104 accesses network resources in a portion of the airspace 700 that is marked as a "preferred connection" or "regular connection". This differential charging may be facilitated by determining the location of the UAV 104. In particular, telemetry data may be transmitted from the UAV 104 to the 3GPP system 100B for determining location and consequent rates for network usage. In some embodiments, network usage rates (i.e., charges for usage) may be included in the network policy information of NCPI maps for use by the UTM system 100A in flight planning or determining deviations in the flight plan.

After determining network connectivity and/or policy information for a number of volume elements 802 to form one or more NCPI maps, the NCPS 102 may transfer the one or more NCPI maps to one or more components of the UTM system 100A at operation 608. In one embodiment, transferring the one or more NCPI maps at operation 608 may include transferring the one or more NCPI maps over the Rx or another interface. In some embodiments, the NCPI maps may be delivered directly to UAVs 104 and/or UAV operations 106, or may be delivered to the USS 120 and distributed by the USS 120 to UAVs 104 and/or UAV operators 106.

In some embodiments, network connectivity and policy information in an NCPI map may be designated as being dependent on a class of subscription associated with the UAV 104. For example, a premium subscription to the 3GPP system 100B may allow the corresponding UAV 104 to use particular bands and/or resources in a particular volume element 802 of the airspace 700. In contrast, a normal/non-premium subscription to the 3GPP system 100B may not allow the corresponding UAV 104 to use these bands and/or resources. Accordingly, in some embodiments, one or more pieces of network connectivity and/or policy information may be associated with a class of subscription. In some embodiments, the UTM system 100A may consult with the UDR/SPR 142 for determining subscription information for a UAV 104 such that appropriate network connectivity and policy information in an NCPI map may be determined.

In some embodiments, NCPI maps may be designated per UAV operator 106 and/or per UAV 104. For example, NCPI maps may be relative to subscription levels associated with each UAV 104. Accordingly, a first NCPI map may be transferred to a first UAV 104 and a second NCPI map may be transferred to a second UAV 104. The first UAV 104 may have a premium subscription within the 3GPP system 100B while the second UAV 104 may have a normal/non-premium subscription within the 3GPP system 100B. In this example, the first NCPI map may include more lenient network policy information (e.g., more available bands, less restricted portions of the airspace 700, etc.) than the second NCPI map. Accordingly, flight planning and deviations to flight plans may be determined to account for subscription/policy differences. In some embodiments, the UTM system 100A may consult with the UDR/SPR 142 for determining subscription information for a UAV 104 such that appropriate network connectivity and policy information in an NCPI map may be determined.

With changing conditions (e.g., more or less UAVs 104 operating in the airspace 700 that alter network utilization, more or less obstructions in the geospatial area, weather conditions, etc.), network connectivity and/or policy information may change over time. To account for these changes, the NCPS 102 may transfer updated or new NCPI maps (or only the changed portions of the NCPI maps) to the UTM system 100A on the basis of these changes. The NCPI map can also change with time of day either as a static policy or adapting to actual available network capacity. In some embodiments, each NCPI map may include timing data that indicates an expiration time/date associated with the NCPI map (e.g., the network connectivity and policy information is not accurate after a predefined date and time) and/or time-of-day dependencies (e.g., network connectivity and policy information in an NCPI map or a portion of an NCPI map is only valid/accurate during a time range).

Although shown and described as receiving NCPI maps from a single network system (e.g., the 3GPP system 100B), NCPI maps may be received by the UTM system 100A from multiple network systems. For example, multiple network systems may service overlapping portions of the airspace 700. In this example, the UTM system 100A may request NCPI maps from each network system servicing particular portions of the airspace 700. Accordingly, the UTM system 100A may combine or otherwise utilize NCPI maps from multiple sources for flight planning and flight plan deviation in a single airspace 700.

Upon receipt, the UTM system 100A may utilize the NCPI map(s) for flight planning purposes and/or flight deviation. In particular, a USS 120 may use an NCPI map to plan a flight for a UAV 104 at operation 610. For example, the USS 120 may determine a set of objectives for the flight (e.g., take-off from point A and stream video en route to point B). Based on the objectives of the flight and on network connectivity and/or policy information provided in the NCPI map, the USS 120 may determine a path through the airspace 700, which provides satisfactory network access to fulfill the objectives of the flight.

In some embodiments, the NCPI map may be delivered to the UTM system 100A (e.g., the UAV 104) for use in deviating from an original flight plan (i.e., a flight plan determined prior to takeoff of the UAV 104). In particular, the UTM system 100A (e.g., a UAV 104) may adjust a flight path based on an NCPI map at operation 612. For example, upon occurrence of an unanticipated event (e.g., traffic at a particular altitude), the UAV 104 may seek a new path through the airspace 700, which still provides the required network resources. This new path may be determined based on network connectivity and/or policy information provided by the NCPI map.

Accordingly, as described above, the network connectivity and/or policy information provided within an NCPI map represents network access in the airspace 700. By using this information to plan or adjust flights for the UAV 104, the UTM system 100A may ensure that network requirements are satisfied throughout a flight mission, including deviations to an original flight plan. In particular, the NCPI maps generated by the NCPS 102 and utilized by the UTM system 100A provide a standardized representation of network access in the three-dimensional airspace 700 that may be configured by the 3GPP system 100B and easily distributed to and utilized by various UTM systems 100A for managing flights of UAVs 104.

Figure 10:
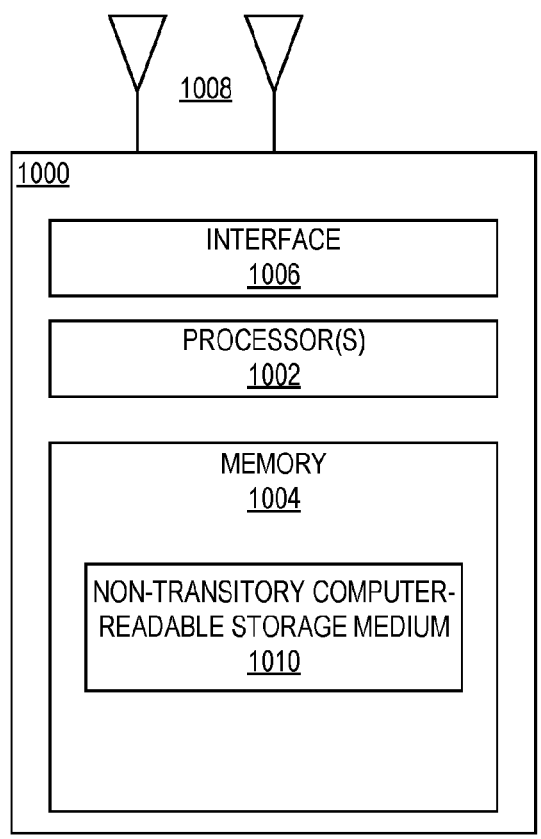
FIG. 10 illustrates a computing/networking device according to one embodiment.

Each element of the air traffic system 100 may be composed of or otherwise implemented by a set of computing/networking devices. For example, FIG. 10, illustrates a computing/networking device 1000 according to one embodiment. As shown the computing/networking device 1000 may include a processor 1002 communicatively coupled to a memory 1004 and an interface 1006. The processor 1002 may be a microprocessor, controller, microcontroller, central processing unit, digital signal processor, application specific integrated circuit, field programmable gate array, any other type of electronic circuitry, or any combination of one or more of the preceding. The processor 1002 may comprise one or more processor cores. In particular embodiments, some or all of the functionality described herein as being provided by a component of the air traffic system 100 may be implemented by one or more processors 1002 of one or more computing/networking devices 1000 executing software instructions, either alone or in conjunction with other computing/networking devices 1000 components, such as the memory 1004.

The memory 1004 may store code (which is composed of software instructions and which is sometimes referred to as computer program code or a computer program) and/or data using non-transitory machine-readable (e.g., computer-readable) media, such as a non-transitory computer-readable storage medium (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory 1004 may comprise non-volatile memory (e.g., a non-transitory computer-readable storage medium 1010) containing code to be executed by the processor 1002. Where the memory 1004 is non-volatile, the code and/or data stored therein can persist even when the computing/networking device 1000 is turned off (when power is removed). In some instances, while the computing/networking device 1000 is turned on, that part of the code that is to be executed by the processor(s) 1002 may be copied from non-volatile memory into volatile memory (e.g., dynamic random-access memory (DRAM), static random-access memory (SRAM)) of the computing/networking device 1000.

The interface 1006 may be used in the wired and/or wireless communication of signaling and/or data to or from computing/networking device 1000. For example, interface 1006 may perform any formatting, coding, or translating to allow computing/networking device 1000 to send and receive data whether over a wired and/or a wireless connection. In some embodiments, the interface 1006 may comprise radio circuitry capable of receiving data from other devices in the network over a wireless connection and/or sending data out to other devices via a wireless connection. This radio circuitry may include transmitter(s), receiver(s), and/or transceiver(s) suitable for radio frequency communication. The radio circuitry may convert digital data into a radio signal having the appropriate parameters (e.g., frequency, timing, channel, bandwidth, etc.). The radio signal may then be transmitted via the antennas 1008 to the appropriate recipient(s). In some embodiments, interface 1006 may comprise network interface controller(s) (NICs), also known as a network interface card, network adapter, local area network (LAN) adapter or physical network interface. The NIC(s) may facilitate in connecting the computing/networking device 1000 to other devices, allowing them to communicate via wire through plugging in a cable to a physical port connected to a NIC. In particular embodiments, the processor 1002 may represent part of the interface 1006, and some or all of the functionality described as being provided by the interface 1006 may be provided in part or in whole by the processor 1002.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing an Unmanned Aerial Vehicle (UAV), in which a 3rd Generation Partnership Project (3GPP) network provides network access to the UAV, comprising:

determining, by a Network Coverage and Policy Server (NCPS), an airspace comprising a set of cells to provide network connectivity by the 3GPP network;

determining, by the NCPS, granularity that indicates sizes for volume elements in a set of volume elements that logically divide the airspace, wherein some volume elements have a first granularity and one or more other elements have a second granularity that is different from the first granularity, wherein volume elements of the first granularity and volume elements of the second granularity overlap, and wherein the network connectivity by the 3GPP network varies in connectivity based on the granularity;

determining, by the NCPS, network policy information for volume elements in the set of volume elements to produce one or more maps, wherein the network policy information is related to the 3GPP network; and generating a flight plan for the UAV based on the one or more maps, wherein the UAV is controlled based on the flight plan.

2. The method of claim 1, wherein each volume element in the set of volume elements is a three-dimensional shape that represents a portion of the airspace.

3. The method of claim 2, wherein the determined granularity indicates non-uniform sizes for the set of volume elements.

4. The method of claim 2, wherein each of the maps in the one or more maps includes a header that describes one or more of (1) the sizes of volume elements in the set of volume elements, (2) properties of the airspace, (3) encoding schemes used by the map, and (4) access information for a network system associated with the map.

5. The method of claim 2, further comprising:

determining, by the NCPS, network connectivity information for volume elements in the set of volume elements, wherein the network policy information and the network connectivity information for the volume elements collectively represent the one or more maps.

6. The method of claim 5, wherein determining the network policy information and the network connectivity information is based on readings from one or more wireless cells serving the airspace or characteristics of the one or more wireless cells serving the airspace.

7. The method of claim 5, wherein determining the network policy information and the network connectivity information is based on readings from one or more devices operating in the airspace.

8. The method of claim 5, wherein the network connectivity information includes one or more of signal measurements and signal classes and wherein the signal classes indicate whether resources in a network system associated with a corresponding map support one or more of a command and control channel and a data streaming channel.

9. The method of claim 5, wherein a first map in the one or more maps includes network connectivity information and network policy information for a first 3GPP network system and a second map in the one or more maps includes network connectivity information and network policy information for a second 3GPP network system.

10. The method of claim 9, wherein the first network system is managed by a first network operator and the second network system is managed by a second network operator.

11. The method of claim 9, wherein the first network system implements a first network technology and the second network system implements a second network technology.

12. The method of claim 5, wherein one map in the one or more maps includes network connectivity information and network policy information for one or more of (1) multiple bands in a first network system, (2) the first network system and a second network system, and (3) multiple network technologies.

13. The method of claim 5, wherein one or more pieces of the network connectivity information and the network policy information are associated with a class of subscription in a network system.

14. The method of claim 5, wherein at least one map in the one or more maps includes timing information indicating expiration of the network connectivity information and the network policy information or time-of-day dependencies for the network connectivity information and the network policy information.

15. The method of claim 1, further comprising:

adjusting the flight plan for the UAV based on the one or more maps.

16. The method of claim 2, wherein the network policy information includes indications of one or more of (1) a preferred band, (2) a preferred network system, and (3) restrictions on network use in one or more volume elements in the set of volume elements and wherein the network policy information is indicated per traffic type.

17. The method of claim 2, wherein the network policy information includes charges per volume element in the set of volume elements.

18. A non-transitory computer-readable storage medium storing instructions which, when executed by a set of one or more processors of a computing device for a Network Coverage and Policy Server (NCPS) for managing an Unmanned Aerial Vehicle (UAV), in which a 3rd Generation Partnership Project (3GPP) network provides network access to the UAV, cause the computing device to:
- determine an airspace comprising a set of cells to provide network connectivity by the 3GPP network;
- determine granularity that indicates sizes for volume elements in a set of volume elements that logically divide the airspace, wherein some volume elements have a first granularity and one or more other elements have a second granularity that is different from the first granularity, wherein volume elements of the first granularity and volume elements of the second granularity overlap, and wherein the network connectivity by the 3GPP network varies in connectivity based on the granularity;
- determine network policy information for volume elements in the set of volume elements to produce one or more maps, wherein the network policy information is related to the 3GPP network; and
- generate a flight plan for the UAV based on the one or more maps, wherein the UAV is controlled based on the flight plan.

19. A network device of a Network Coverage and Policy Server (NCPS) for managing an Unmanned Aerial Vehicle (UAV), in which a 3rd Generation Partnership Project (3GPP) network provides network access to the UAV, comprising:

a processor;

a memory coupled to the processor, wherein the memory includes one or more instructions that when executed by the processor cause the network device to:
- determine an airspace comprising a set of cells to provide network connectivity by the 3GPP network;
- determine granularity that indicates sizes for volume elements in a set of volume elements that logically divide the airspace, wherein some volume elements have a first granularity and one or more other elements have a second granularity that is different from the first granularity, wherein volume elements of the first granularity and volume elements of the second granularity overlap, and wherein the network connectivity by the 3GPP network varies in connectivity based on the granularity;
- determine network policy information for volume elements in the set of volume elements to produce one or more maps, wherein the network policy information is related to the 3GPP network; and
- generate a flight plan for the UAV based on the one or more maps, wherein the UAV is controlled based on the flight plan.

* * * * *